US000001858H

United States Statutory Invention Registration [19]

[11] Reg. Number: H1,858

Ibelings

[45] Published: Sep. 5, 2000

[54] RADIO FREQUENCY SENSED, SWITCHED REVERSE PATH TAP

[75] Inventor: Pieter G. Ibelings, Norcross, Ga.

[73] Assignee: Scientific-Atlanta, Inc., Norcross, Ga.

[21] Appl. No.: 09/105,407

[22] Filed: Jun. 26, 1998

[51] Int. Cl.[7] ..... H04N 7/10

[52] U.S. Cl. ..... 348/12

[58] Field of Search ..... 348/12, 13, 7, 348/10, 11; 455/5.1, 6.1, 4.1, 3.1, 6.7; 333/101, 109, 125, 135

[56] References Cited

U.S. PATENT DOCUMENTS

| | | | |
|---|---|---|---|
| 3,846,703 | 11/1974 | Stewart et al. . | |
| 3,886,454 | 5/1975 | Oakley et al. . | |
| 3,924,187 | 12/1975 | Dormans . | |
| 4,118,669 | 10/1978 | Fung . | |
| 4,752,954 | 6/1988 | Masuko . | |
| 4,928,272 | 5/1990 | Ohue . | |
| 4,982,440 | 1/1991 | Dufresne et al. . | |
| 5,058,198 | 10/1991 | Rocci | 455/3 |
| 5,126,840 | 6/1992 | Dufresne et al. . | |
| 5,317,392 | 5/1994 | Ishibashi et al. . | |
| 5,343,239 | 8/1994 | Lappington et al. . | |
| 5,505,901 | 4/1996 | Harney et al. . | |

*Primary Examiner*—Daniel T.. Pihulic
*Attorney, Agent, or Firm*—Kenneth M. Massaroni; Kelly A. Gardner; Hubert J. Barnhardt, III

[57] ABSTRACT

A bidirectional communications system is provided for sending signals along a cable in a forward path from a central location to a plurality of remote receiver locations and for sending return signals along the same cable in a reverse path from the remote receiver locations to the central location. The communications system includes a plurality of taps placed along the cable for splitting the signals to be sent to the remote receiver locations, and a radio frequency sensed switch placed at each of the plurality of taps for sensing the return signals so as to turn on the reverse path when the return signals are present and to turn off the reverse path when no return signals are present.

16 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RADIO FREQUENCY SENSED, SWITCHED REVERSE PATH TAP

FIELD OF THE INVENTION

The present invention generally relates to bidirectional cable television ("CATV") transmission and distribution systems and, more particularly, to a radio frequency ("RF") sensed switch at a tap for minimizing reverse noise ingress by terminating reverse paths that have no signal traffic.

BACKGROUND OF THE INVENTION

Many CATV transmission and distribution systems currently provide bidirectional communications. Typically, they contain bidirectional amplifiers for transmitting signals both from headends to subscribers and from subscribers to headends. FIG. 1 illustrates a bidirectional CATV transmission and distribution system 100 in accordance with the prior art. The CATV system 100 includes a headend 110, a trunk 120, and distribution lines 130 and 132. An amplifier 160 is provided for amplifying downstream signal 170 and upstream signals 180 and 182. Distribution line 130 connects subscriber drops 140 and 142, and distribution line 132 connects subscriber drops 144 and 146. Subscriber drops 140, 142, 144, and 146 connect subscriber station equipment 150, 152, 154, and 156, e.g., TV sets, respectively.

The station equipment 150, 152, 154, and 156 in the prior art includes upstream signal generation means as described in Canadian Patent No. 1,177,558 to Dufresne et al. (hereinafter the '558 patent). As disclosed in the '558 patent, at least one bidirectional amplifier 160 is usually connected in series with the trunk 120 for amplifying downstream signals 170 and upstream signals 180 and 182. In the prior art system, in addition to transmitting upstream signals, a significant amount of noise is passed upstream from the distribution lines, subscriber drops, and station equipment. This noise is typically caused by electronic or RF signals, poor terminal connections, ground currents, power lines and noise carried thereon, etc. Such noise generally arises on the subscriber drops and distribution lines and is subsequently fed into the trunk and headend in the upstream direction. As such, it has been found that bidirectional systems in accordance with the prior art have been unsuccessful because of a major noise gathering problem in the upstream direction. The noise is random and interferes to a prohibitive extent with legitimate signals transmitted upstream from the various subscribers. The noise problem has been referred to in the art as the "funneling effect" because the noise is aggregated and collected and funneled at the headend 110.

Many current CATV transmission and distribution systems attempt to resolve the above problem of noise ingress in the upstream direction. One such system is disclosed in U.S. Pat. No. 5,126,840 to Dufresne et al. (hereinafter '840 patent). FIG. 2 illustrates a bidirectional CATV transmission and distribution system 200 in accordance with the teachings of the '840 patent. The CATV system 200 includes a headend 210, a trunk 220, and distribution lines 230 and 232. Distribution line 230 connects subscriber drops 240 and 242, and distribution line 232 connects subscriber drops 244 and 246. Subscriber drops 240, 242, 244, and 246 connect subscriber station equipment 250, 252, 254, and 256, e.g., TV sets, respectively. The '840 patent further teaches placing narrowband upstream filters 260 and 262 in the distribution lines 230 and 232, respectively, and/or placing a narrowband upstream filter 264 in the trunk 220 for reducing upstream noise gathering. The narrowband upstream filters 260, 262, and 264 sense upstream signal energy and open when the signal energy exceeds a predetermined threshold.

According to one embodiment of the '840 patent and referring to FIG. 3, upstream signals are contained in one or more narrow bands within the low band 310 preferably centered at two frequencies, 11 MHz, as illustrated by reference number 320, and 26 MHz, as illustrated by reference number 330, with a bandwidth of 1 MHz. Narrowband upstream filters are located in the distribution lines 230 and 232. A result of this technique is that upstream signals outside the narrow bandwidth of the upstream signaling bands are blocked. According to this technique, the likelihood of overloading the upstream amplifiers, e.g., amplifier 270 in FIG. 2, by noise signals is low.

A disadvantage of this technique, however, is that it attempts to prevent noise from entering the CATV system at the amplifier level (e.g., amplifier 270), where hundreds of subscribers are typically connected for funneling upstream signals. As such, the likelihood of an amplifier being switched "on" is very high, i.e., at least one of the many subscribers connected to that amplifier is always transmitting upstream signals at any given time. In other words, since there are so many subscribers connected to each amplifier, the probability of no one using that amplifier and, thus, turning it "off", is practically zero because someone is always transmitting upstream signals. As a result of placing filters at the amplifier level, the CATV system in accordance with the prior art is still susceptible to random noise entering the system even when the majority of the subscribers are not transmitting upstream signals, as long as at least one subscriber is transmitting upstream signals. Moreover, with the switch placed at the amplifier level, if the switch ever fails, then the hundreds of subscribers connected to that amplifier will lose their CATV services. In addition, the more upstream signals funneling into the amplifier, the greater the possibility of false triggering of the amplifier. This is due to the problem of noise compounding from the many subscribers. Accordingly, there is a significant need for an improved apparatus and method for minimizing the problem of reversed noise ingress by terminating reverse paths that have no signal traffic.

DETAILED DESCRIPTION OF A PREFERRED EMBODIMENT

Figure 4:
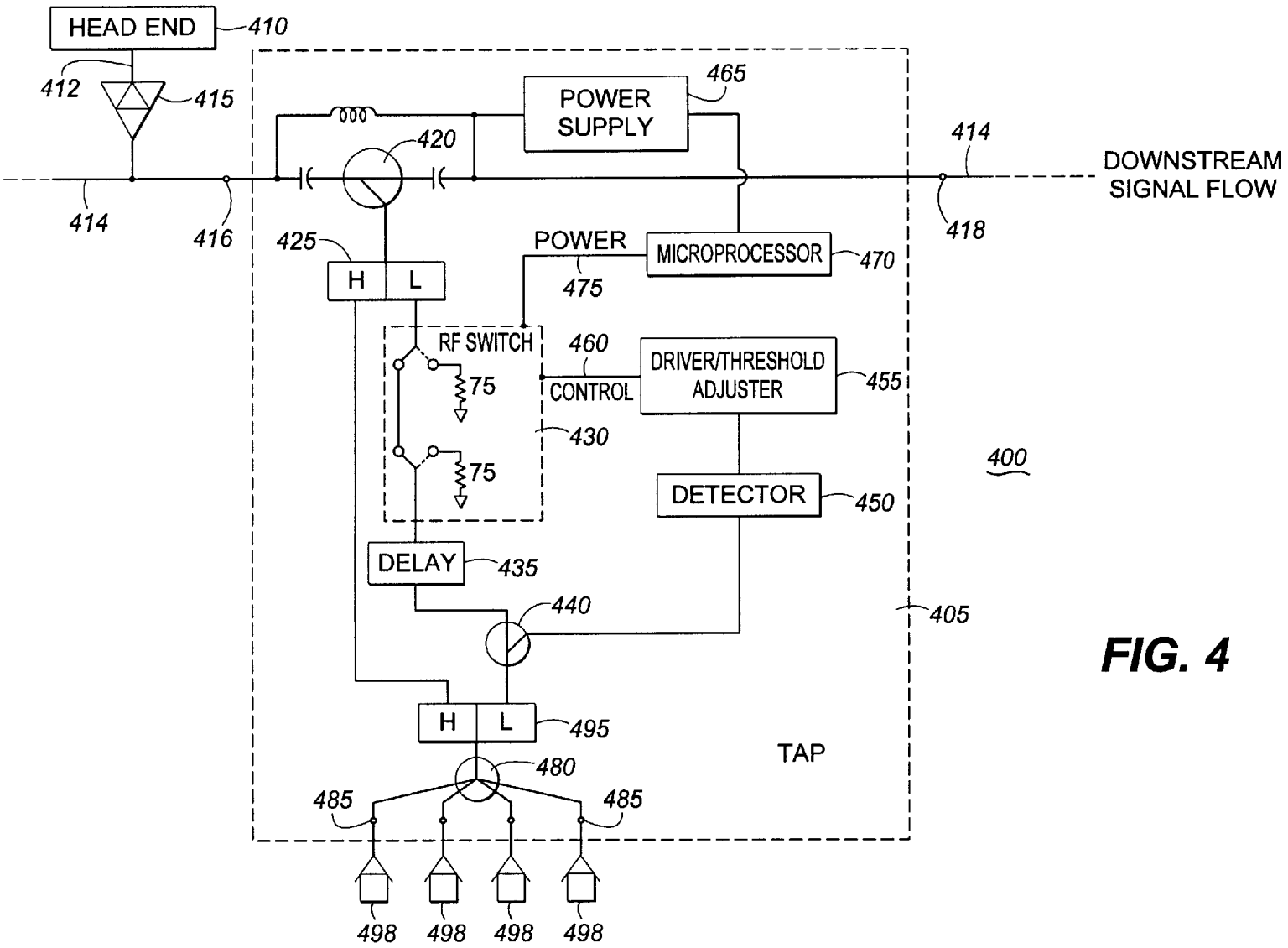
FIG. 4 illustrates a bidirectional CATV transmission and distribution system in accordance with the teachings of the present invention.

Referring to FIG. 4, a bidirectional CATV transmission and distribution system 400 in accordance with the teachings of the present invention is shown. The CATV system 400 includes a headend 410, a trunk 412, and a distribution line 414. An amplifier 415 is provided on the trunk 412 for amplifying upstream and downstream signals. A cable television tap 405 is coupled at its input 416 and its output 418 to the distribution line 414 for tapping off a portion of the radio frequency (RF) signal provided on the distribution line 414. According to the present invention, the tap 405 includes RF switching means for selectively coupling upstream signals from subscriber equipment through a coupler 420 to the headend 410 via the distribution line 414 and other components, as will be explained in greater detail below.

As mentioned, the tap 405 includes the coupler 420, which splits off a portion of the RF signal for subscriber equipment 498 and passes a portion of the RF signal at its output 418 for processing by further cable television equipment (not shown). The tap 405 also includes a diplex filter 425 for providing highpass filtering for incoming, downstream signals and lowpass filtering for outgoing, upstream filtering. The downstream signal is provided in the forward direction from the first diplex filter 425 to a second diplex filter 495 and then to a multiple output splitter 480 for transmitting the split signal to subscriber drops 485. Subscriber equipment 498, such as telecommunications equipment, computers, televisions, set top decoders, etc., can be coupled to the subscriber drops 485 to receive the downstream signals and to also transmit upstream signals to the headend 410 via the tap 405.

In the reverse direction, an RF sensed switch 430 is provided for selectively forwarding the upstream signal from the subscriber equipment 498 to the headend 410. More specifically, the tap 405 includes a detector 450 that is coupled by a directional coupler 440 to receive upstream signals. When upstream signal energy exceeds a predetermined threshold, a control signal is provided via a control line 460 to direct the RF switch 430 to couple the upstream signal from diplex filter 495 to diplex filter 425. The threshold level may be adjusted by adjusting a driver/threshold adjuster circuit 455. During periods of time when no reverse activity is present or when the reverse activity does not exceed the predetermined threshold, the RF sensed switch 430 reverts to its "off" position in which upstream signals are not coupled to diplexer 425. By doing this, the tap 405 advantageously minimizes the funneling of noise in the reverse band since all reverse paths not in use are terminated.

Preferably, the tap 405 further includes means for powering the RF sensed switch 430. This can be done, for example, by including a direct current (DC) power supply 465 for providing a DC voltage, e.g., 24 volts. A microprocessor 470 could be coupled to the power supply 465 for powering the switch 430 via a power line 475 or, alternatively, the power supply 465 could be connected directly to a power port of the RF switch 430. It will be appreciated that the microprocessor 470 could also, if desired, perform the operations of both the detector 450 and the driver/threshold adjuster 455, or it could be coupled to either or both of the detector 450 or the driver/threshold adjuster 455. It will be further appreciated that, depending on the speed of the detector 450 and the RF sensed switch 430, there might be a need for placing a delay line 435 between the directional coupler 440 and the RF sensed switch 470 in the reverse path. The delay line 435 provides time for the RF sensed switch 430 to react to the incoming upstream signal without truncating the first part of the upstream signal.

Figure 1:
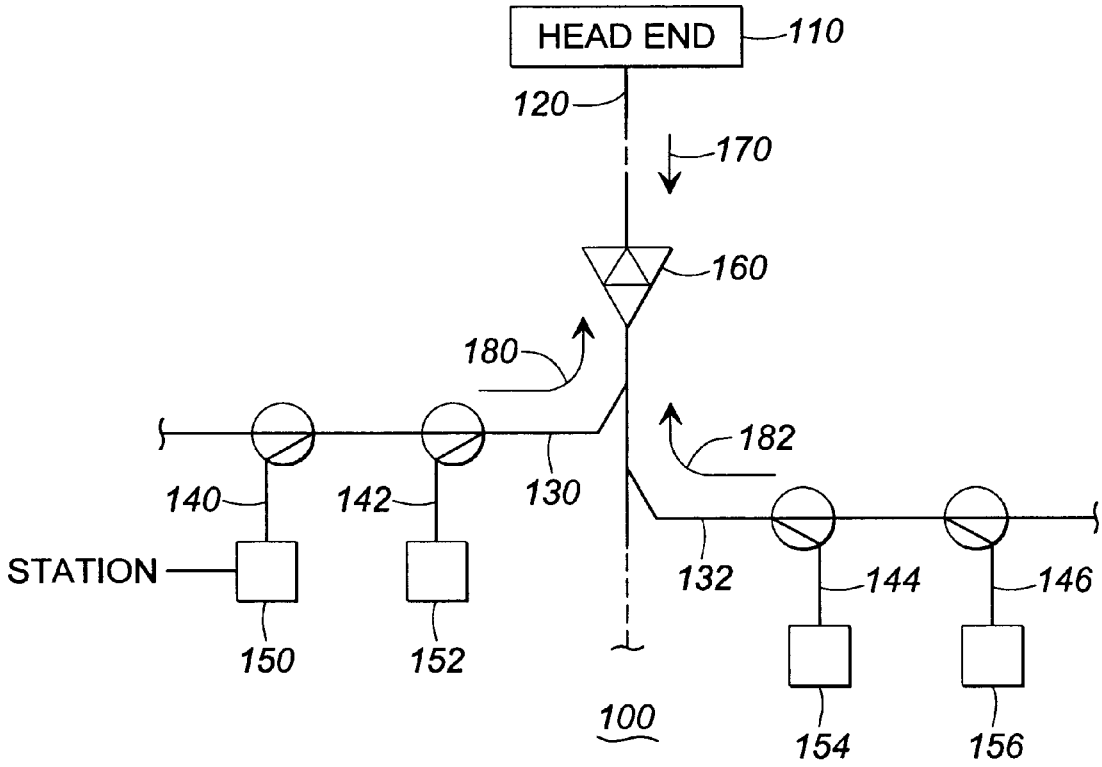
FIG. 1 PRIOR ART
FIG. 1 illustrates a bidirectional CATV transmission and distribution system according to the prior art.
Figure 3:
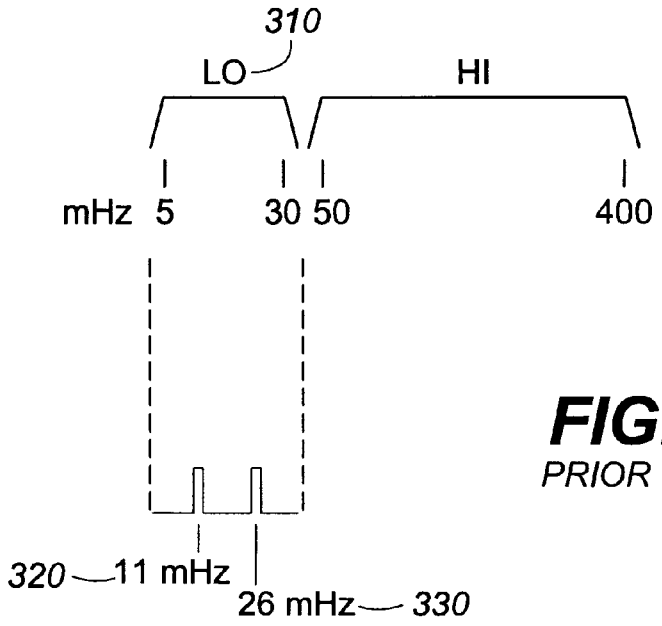
FIG. 3 PRIOR ART
FIG. 3 illustrates signal frequencies of the upstream signals in accordance with a technique of the prior art.
Figure 2:
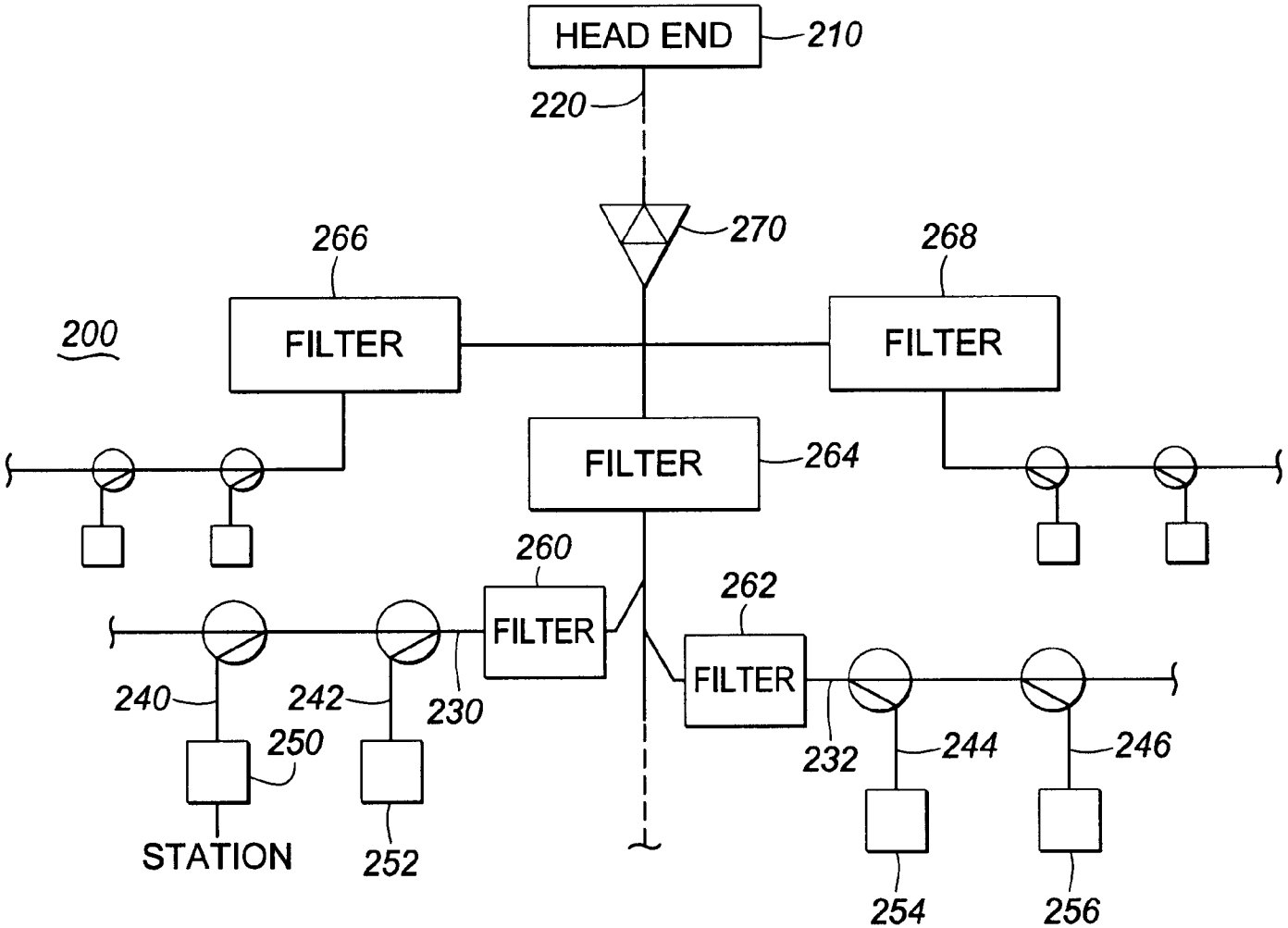
FIG. 2 PRIOR ART
FIG. 2 illustrates another bidirectional CATV transmission and distribution system according to the prior art.

In contrast to the prior art CATV systems, the present system detects noise at the tap level by using an RF sensed switch 430 within the tap 405 itself, instead of at the amplifier level 27 as illustrated in FIG. 2 and instead of including switching circuitry outside the tap, which requires separately manufactured, installed, housed, powered, and operated devices. By detecting and preventing noise from entering a CATV distribution and transmission system at the tap level within the tap, the ability to restrict transmission of upstream noise is much greater. For example, a tap typically connects four to eight subscribers, which means that the probability that no subscribers will be transmitting upstream is much higher than at the amplifier level, where typically hundreds of subscribers are connected to each amplifier. A result and advantage of this technique is that more noise is kept out of the CATV distribution and transmission system, since taps with no reverse traffic are switched "off" and, thus, random noise from subscribers connected at those taps is effectively prevented from entering the CATV system. Furthermore, this is conveniently done without introducing additional parts into the CATV system and in a simple, inexpensive manner that is transparent to the service provider and installer.

As shown in FIG. 4, the tap is the first place where noise may enter the CATV system. Therefore, by stopping noise from entering the CATV system at the tap itself, the total amount of noise entering the CATV system is much lower. In contrast, by sensing noise at the amplifier level, noise from hundreds of other subscribers with no reverse traffic may still enter the CATV system if even one of the many subscribers is transmitting upstream signals. Furthermore, use of additional switching circuitry outside the tap can result in the introduction of even more upstream noise into the system. An even further advantage of the present invention is that placement of the RF sensed switch within the tap itself and within the same housing means that, if the switch fails for some reason, then only four to eight subscribers, i.e., the subscribers coupled to the drops 485, will lose their CATV services.

Accordingly, it is an advantage of the present invention that the tap including the RF sensed switch minimizes the problem of reverse noise ingress by terminating reverse paths that have no signal traffic.

What is claimed is:

1. A bidirectional communications system wherein signals are sent along a cable in a forward path from a central location to a plurality of remote receiver locations and return signals are sent along the same cable in a reverse path from the remote receiver locations to the central location, the communications system comprising:

a plurality of taps placed along the cable for splitting the signals to be sent to the remote receiver locations, wherein at least one tap includes a radio frequency (RF) sensed switch for enabling the reverse path when return signals from the remote receiver locations coupled to the at least one tap are present and for disabling the reverse path when no return signals from the remote receiver locations coupled to the at least one tap are present.

2. The communications system of claim 1, wherein the at least one tap comprises:

a power supply for providing power to the RF sensed switch.

3. The communications system of claim 1, wherein approximately four to eight remote receiver locations are connected at each of said plurality of taps, including the at least one tap.

4. The communications system of claim 1, wherein the communications system is a cable television system.

5. The communications system of claim 4, wherein the central location is a headend.

6. The communications system of claim 4, further comprising:

subscriber equipment located at the remote receiver locations.

7. A method of minimizing reverse noise ingress in a reverse path of a bidirectional communications system wherein signals are sent along a cable in a forward path from a central location to a plurality of remote receiver locations, and return signals are sent along the cable in the reverse path from the remote receiver locations to the central location, the method comprising the steps of:

placing a tap along the cable for splitting signals to be sent in the forward path to subscriber equipment located at remote receiver locations coupled to the tap, wherein the tap includes an RF sensed switch for selectively enabling the return signals through the tap;

operating the RF sensed switch to enable the reverse path through the tap when a return signal from the subscriber equipment is present; and operating the RF sensed switch to disable the reverse path through the tap when no return signal from the subscriber equipment is present.

8. The method of claim 7, further comprising the step of placing approximately four to eight remote receiver locations at the tap.

9. The method of claim 7, further comprising the step of determining that signal energy in the reverse path of the tap exceeds a predetermined threshold, in response to which the enabling step occurs.

10. The method of claim 7, wherein the disabling step is a default condition that occurs automatically.

11. A tap for use in a cable television system, the tap comprising:

a forward path for routing RF signals to output terminals to which subscriber equipment is coupled;

a reverse path for routing signals from the subscriber equipment to the cable television system; and an RF sensed switch for selectively enabling the reverse path in response to detecting the presence of a signal from the subscriber equipment.

12. The tap of claim 11, further comprising:

a direct current power supply coupled to the RF sensed switch for providing power thereto.

13. The tap of claim 11, wherein the forward path comprises:

a directional coupler for splitting off the RF signals from the cable television system;

a filter coupled to the directional coupler for filtering the RF signals; and a multiple output splitter for dividing the RF signals for transmission to the output terminals.

14. The tap of claim 11, wherein the reverse path comprises:

a filter for filtering return signals from the subscriber equipment; and a detector for controlling the RF sensed switch.

15. The tap of claim 11, further comprising:

a detector for detecting the presence of a return signal from the subscriber equipment in response to which a control signal is provided by the detector to the RF sensed switch to enable the reverse path.

16. The tap of claim 15, further comprising:

a threshold adjuster coupled to the detector for setting a threshold, wherein the detector provides the control signal in response to determining that return signal energy exceeds the threshold

* * * * *